United States Patent
Hallivuori

(10) Patent No.: US 10,777,890 B2
(45) Date of Patent: Sep. 15, 2020

(54) DIGITALLY CONTROLLED PHASE SHIFTER AND METHOD

(71) Applicant: Nokia Solutions and Networks Oy, Espoo (FI)

(72) Inventor: Juha Samuel Hallivuori, Tampere (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 175 days.

(21) Appl. No.: 15/847,039

(22) Filed: Dec. 19, 2017

(65) Prior Publication Data

US 2019/0190147 A1   Jun. 20, 2019

(51) Int. Cl.
*H01Q 3/38* (2006.01)
*H01Q 3/26* (2006.01)
*H01Q 21/22* (2006.01)

(52) U.S. Cl.
CPC .............. *H01Q 3/38* (2013.01); *H01Q 3/267* (2013.01); *H01Q 21/22* (2013.01)

(58) Field of Classification Search
CPC . H04B 17/12; H01P 5/18; H01Q 3/26; H01Q 3/267; H01Q 3/38
USPC ........................................................ 342/372
See application file for complete search history.

(56) References Cited

U.S. PATENT DOCUMENTS

| | | |
|---|---|---|
| 4,027,254 A | 5/1977 | Gunton et al. |
| 4,602,227 A | 7/1986 | Clark et al. |
| 5,412,414 A | 5/1995 | Ast et al. |
| 6,275,120 B1 | 8/2001 | Vaninetti et al. |
| 7,164,903 B1 | 1/2007 | Cliff et al. |
| 2006/0109066 A1 | 5/2006 | Borysenko |
| 2009/0278624 A1 | 11/2009 | Tsai et al. |
| 2017/0155181 A1 | 6/2017 | Katz et al. |
| 2017/0194688 A1 | 7/2017 | Sharma et al. |

OTHER PUBLICATIONS

Cheng, C.-C. et al., *High Performance 1.8-2.4 GHz Phase Shifter Using Silicon-on-Sapphire Digitally Tunable Capacitors*, Microwave Symposium Digest (IMS), IEEE MTT-S International (2013) 3 pages.
*Interdigitated Stripline Quadrature Hybrid*, IEEE Transactions on Microwave Theory and Techniques (Dec. 1969) 1150-1151.
Katoch, M. et al., *Compact Microstrip Phase Shifter for Beam Steering Antenna*, Proceedings of the Asia-Pacific Microwave Conference (2016) 5 pages.

(Continued)

*Primary Examiner* — Dao L Phan
(74) *Attorney, Agent, or Firm* — Alston & Bird LLP

(57) ABSTRACT

A digitally controlled phase shifter for an antenna is provided. The phase shifter includes a coupler extending between input and output ports and first and second digitally tunable capacitance circuitry coupled to opposite ends of the coupler. Each first and second digitally tunable capacitance circuitry includes a digitally tunable capacitance. The phase shifter also includes control circuitry that includes at least one processor and at least one memory including computer program code. The at least one memory and the computer program code are configured to, upon execution by the at least one processor, cause the control circuitry to vary the capacitance of the digitally tunable capacitance of at least one of the first and second digitally tunable capacitance circuitry in order to modify a phase shift provided by the phase shifter. A control circuitry and a method are also provided for controlling the phase shift provided by a phase shifter.

20 Claims, 7 Drawing Sheets

(56) References Cited

OTHER PUBLICATIONS

Kim, D. et al., *A Wide-Band Reflection-Type Phase Shifter at S-Band Using BST Coated Substrate*, IEEE Transactions on Microwave Theory and Techniques, vol. 50, No. 12, (Dec. 2002) 2903-2909.

Miyaguchi, K. et al., *An Ultra-Broad-Band Reflection-Type Phase-Shifter MMIC With Series and Parallel LC Circuits*, IEEE Transactions on Microwave Theory and Techniques, vol. 49, No. 12, (Dec. 2001) 2446-2452.

Nikfalazar, M. et al., *Beam Steering Phased Array Antenna With Fully Printed Phase Shifters Based on Low-Temperature Sintered BST-Composite Thick Films*, IEEE Microwave and Wireless Components Letters, vol. 26, No. 1, (Jan. 2016) 70-72.

*Peregrine Semiconductor: Product Specification: PE64906*. Peregrine Semiconductor Corp. Document No. DOC-30114-3. 2013, 11 pages.

*Phase Shifter Phase Detectors/Shifters* [online] [retrieved Mar. 21, 2018]. Retrieved from the Internet: <URL: https://www.mouser.fi/Semiconductors/Integrated-Circuits-ICs/RF-Integrated-Circuits/Phase-Detectors-Shifters/_/N-73tyl?P=1yzrjc6Z1yofrqtZ1yzrjc7Z1yg48gnZ1ygbapaZ1yg486zZ1yzng1vZ1ya6vvb&Ns=Pricing%7C0>. 2 pages.

*SmarTune Antenna Tuner: 32CK417R: Product Description*. Cavendish Kinetics, 2016, 10 pages.

Tanaka, T. et al., *New Slot-Coupled Directional Couplers Between Double-Sided Substrate Microstrip Lines*, and Their Applications, IEEE MTT-S Digest (1988) 579-582.

Zhu, L. et al., *Ultrabroad-Band Vertical Transition for Multilayer Integrated Circuits*, IEEE Microwave and Guided Wave Letters, vol. 9, No. 11 (Nov. 1999) 453-455.

International Search Report and Written Opinion for Application No. PCT/FI2018/050901 dated Mar. 15, 2019, 16 pages.

Gurbuz, O. D. et al., *A 1.6-2.3-GHz RF MEMS Reconfigurable Quadrature Coupler and Its Application to a 360° Reflective-Type Phase Shifter*, IEEE Transactions on Microwave Theory and Techniques, vol. 63, No. 2 (Feb. 2015) 414-421.

Fang, H. R. et al., *180° and 90° Reflection-Type Phase Shifters Using Over-Coupled Lange Couplers*, IEEE Transactions on Microwave Theory and Techniques, vol. 60, No. 11 (Nov. 2012) 3440-3448.

//  DIGITALLY CONTROLLED PHASE SHIFTER AND METHOD

TECHNOLOGICAL FIELD

An example embodiment relates generally to a digitally controlled phase shifter, control circuitry and associated method, and, more particularly, to a digitally controlled phase shifter, control circuitry and associated method for permitting selective modification of the phase shift provided by the phase shifter.

BACKGROUND

Beam steering of antennas is employed in a number of applications in order to change the direction of the main lobe of a radiation pattern. For example, antennas that employ beam steering are utilized by radio systems including those deployed in mobile telephony applications, such as the antennas that support communication between base stations and other network equipment and the user equipment. In this regard, the antennas that support radio frequency (RF) communication in radio systems may be phased array antennas that include a plurality of antenna elements. The relative phases of the RF signals driving the various antenna elements may be controlled in order to effectively steer the direction of the main beam of the radiation pattern of the phased array antennas.

In order to steer an antenna, the antenna may include or be associated with a phase shifter. For a phased array antenna, the antenna includes a plurality of phase shifters, one of which is associated with each antenna element. The performance of the antenna is dependent upon the accuracy with which the main lobe is steered, such as the accuracy with which a phase shifter steers the respective antenna element. In this regard, the quality of the radiation pattern of a phased array antenna is the result of accurate phasing of the individual antenna elements of the phased array antenna.

The phase shift to be provided by a phase shifter may be predefined based upon the specifications according to which the antenna is to be manufactured and the anticipated antenna performance. However, variations during the manufacture of the various components of the antenna including the thickness of the metal traces, the thickness of the printed circuit boards and/or the variation in quality and composition of the materials from which the antenna is constructed, the size of various components of the antenna and the like, may cause the performance of the antenna to deviate, at least slightly, from the anticipated antenna performance. As such, a phase shifter may be calibrated in order to provide the predefined phase shift such that the antenna may continue to provide the desired beam steering even though the manufacture of the antenna may have deviated slightly from the specifications. The calibration of a phase shifter may be performed during or immediately following manufacture of the antenna or during initial installation of the antenna.

The calibration of a phase shifter may require extensive testing of the antenna and, as a result, may be time consuming. For a phased array antenna having a plurality of antenna elements and a plurality of phase shifters, one of which is associated with each antenna element, the calibration process may be more extensive as each phase shifter must be individually calibrated. The time required for the calibration of the phase shifters of an antenna array is further increased for dual polarized antennas in which each antenna element is associated with two phase shifters, one for each polarization. As such, the calibration of the phase shifters of an antenna array as required to ensure the antenna performs as intended may be more time consuming than desired.

BRIEF SUMMARY

A digitally controlled phase shifter, control circuitry and method are provided in accordance with an example embodiment in order to facilitate the calibration of the phase shifter. In this regard, the digitally controlled phase shifter, control circuitry and method of an example embodiment permit the phase shift provided by the phase shifter to be controlled or modified such that the antenna is able to be beam steered in the desired manner. However, the digitally controlled phase shifter, control circuitry and method of an example embodiment perform the calibration in an automated and efficient manner in which the calibration process is driven by the execution of computer program code stored by at least one memory and executed by at least one processor of the control circuitry that interacts with the phase shifter. Thus, even in instances in which the antenna includes a plurality of antenna elements and a corresponding plurality of phase shifters, the plurality of phase shifters may be individually calibrated in an efficient and reliable manner so as to accommodate variations in the manufacturing process while improving the resulting performance and beam steering provided by the antenna.

In an example embodiment, a digitally controlled phase shifter for an antenna is provided that includes a coupler extending between input and output ports. For example, the coupler may be a double finger coupler extending between an input and an output of the digitally controlled phase shifter. In one embodiment, the coupler is positioned in alignment with a slot defined by the ground plane. The digitally controlled phase shifter also includes first and second digitally tunable capacitance circuitry coupled to opposite ends of the coupler. Each of the first and second digitally tunable capacitance circuitry includes a digitally tunable capacitance. The digitally controlled phase shifter further includes control circuitry that includes at least one processor and at least one memory including computer program code. The at least one memory and the computer program code are configured to, upon execution by the at least one processor, cause the control circuitry to vary the capacitance provided by the digitally tunable capacitance and at least one of the first and second digitally tunable capacitance circuitry in order to modify the phase shift provided by the digitally controlled phase shifter.

Prior to varying the capacitance, the at least one memory and the computer program code are further configured to, upon execution by the at least one processor, cause a control signal to be provided to the digitally tunable capacitance of at least one of the first and second digitally tunable capacitance circuitry to establish an initial capacitance provided by the digitally tunable capacitance. Following the varying of the capacitance, the at least one memory and the computer program code are further configured to, upon execution by the at least one processor, determine a calibrated capacitance provided by the digitally tunable capacitance of the at least one of the first and second digitally tunable capacitance circuitry based upon system performance in response to the digitally tunable capacitance having the one or more candidate capacitances.

In one embodiment, the at least one memory and the computer program code are configured to, upon execution by the at least one processor, cause the control signal to be provided to establish the initial capacitance based upon a predefined parameter corresponding to the initial capacitance stored by the at least one memory. In an example embodiment, the at least one memory and the computer program code are configured to, upon execution by the at least one processor, cause a control signal to be provided to vary the capacitance so as to have one or more candidate capacitances greater than the initial capacitance and one or more candidate capacitances less than the initial capacitance. In an example embodiment, the at least one memory and the computer program code are configured to, upon execution by the at least one processor, determine the calibrated capacitance based upon the power provided by a radio to the antenna.

The antenna of an example embodiment includes a plurality of antenna elements and a plurality of phase shifters associated with respective antenna elements including the digitally controlled phase shifter associated with a first antenna element. In this example embodiment, the at least one memory and the computer program code are further configured to, upon execution by the at least one processor and prior to varying the capacitance and determining the calibrated capacitance, cause control signals to be provided to digitally tunable capacitance of first and second digitally tunable capacitance circuitry coupled at opposite ends of a coupler of the plurality of phase shifters other than the digitally controlled phase shifter associated with the first antenna element. The control signals establish a capacitance provided by the digitally tunable capacitance such that the plurality of phase shifters other than the digitally controlled phase shifter eliminate contributions to the system performance from the antenna elements associated with the plurality of phase shifters other than the digitally controlled phase shifter associated with the first antenna element.

In another example embodiment, a control circuitry is provided for controlling the phase shift provided by a digitally controlled phase shifter for an antenna. The digitally controlled phase shifter includes first and second digitally tunable capacitance circuitry coupled at opposite ends of a coupler. The control circuitry includes at least one processor and at least one memory including computer program code. The at least one memory and the computer program code are configured to, upon execution by the at least one processor, cause a control signal to be provided to the digitally tunable capacitance of the at least one of the first and second digitally tunable capacitance circuitry to vary the capacitance provided by the digitally tunable capacitance so as to have one or more candidate capacitances and to correspondingly modify the phase shift provided by the digitally controlled phase shifter.

In an example embodiment, prior to varying the capacitance, the at least one memory and the computer program code are further configured to, upon execution by the at least one processor, cause a control signal to be provided to the digitally tunable capacitance of the at least one of the first and second digitally tunable capacitance circuitry to establish an initial capacitance provided by the digitally tunable capacitance. Following the varying of the capacitance, the at least one memory and the computer program code of this example embodiment are further configured to, upon execution by the at least one processor, determine a calibrated capacitance provided by the digitally tunable capacitance of the at least one of the first and second digitally tunable capacitance circuitry based upon the system performance in response to the digitally tunable capacitance providing the one or more candidate capacitances.

In an example embodiment, the at least one memory and computer program code are configured to, upon execution by the at least one processor, cause the control signal to be provided to establish the initial capacitance based upon a predefined parameter corresponding to the initial capacitance stored by the at least one memory. The at least one memory and the computer program code of an example embodiment are configured to, upon execution by the at least one processor, cause the control signal to be provided to vary the capacitance so as to have one or more candidate capacitances greater than the initial capacitance and one or more candidate capacitances less than the initial capacitance. In an example embodiment, the at least one memory and the computer program code are configured to, upon execution by the at least one processor, determine the calibrated capacitance based upon the power provided by a radio to the antenna.

In an example embodiment, the antenna includes a plurality of antenna elements and a plurality of phase shifters associated with the respective antenna elements including a digitally controlled phase shifter associated with a first antenna element. In this example embodiment, the at least one memory and the computer program code are further configured to, upon execution by the at least one processor and prior to varying the capacitance and determining the calibrated capacitance, cause control signals to be provided to digitally tunable capacitance of first and second digitally tunable capacitance circuitry coupled at opposite ends of a coupler of the plurality of phase shifters other than the digitally controlled phase shifter associated with the first antenna element in order to establish a capacitance provided by the digitally tunable capacitance such that the plurality of phase shifters other than the digitally controlled phase shifter associated with the first antenna element eliminate contributions to the system performance from the antenna elements associated with the plurality of phase shifters other than the digitally controlled phase shifter associated with the first antenna element.

In a further example embodiment, a method is provided for controlling the phase shift provided by a first digitally controlled phase shifter for an antenna. For the digitally controlled phase shifter including first and second digitally tunable capacitance circuitry coupled to opposite ends of a coupler, the method includes establishing an initial capacitance provided by a digitally tunable capacitance of the first and second digitally tunable capacitance circuitry. In response to control signals provided by at least one processor responsive to execution of computer program code stored by at least one memory, the method includes varying the capacitance provided by the digitally tunable capacitance of at least one of the first and second digitally tunable capacitance circuitry to have one or more candidate capacitances. The method further includes determining a calibrated capacitance provided by the digitally tunable capacitance of the least one of the first and second digitally tunable capacitance circuitry based upon system performance in response to the digitally tunable capacitance having the one or more candidate capacitances.

In an example embodiment, the method establishes the initial capacitance in response to control signals provided by at least one processor based upon a predefined parameter corresponding to the initial capacitance stored by the at least one memory. The method of an example embodiment varies the capacitance by varying the capacitance to have one or more candidate capacitances greater than the initial capacitance and one or more candidate capacitances less than the initial capacitance. In an example embodiment, the method determines the calibrated capacitance based upon the power provided by a radio to the antenna.

In an example embodiment, the antenna includes a plurality of antenna elements and a plurality of phase shifters associated with respective antenna elements including the first digitally controlled phase shifter associated with a first antenna element. The method of this example embodiment also includes, prior to varying the capacitance and determining the calibrated capacitance, establishing, in response to control signals provided by the at least one processor responsive to execution of computer program code stored by at least one memory, a capacitance provided by a digitally tunable capacitance of first and second digitally tunable capacitance circuitry coupled to opposite ends of a coupler of a plurality of phase shifters other than the first digitally controlled phase shifter such that the plurality of phase shifters other than the first digitally controlled phase shifter eliminate contributions to the system performance from the antenna elements associated with the plurality of phase shifters other than the first digitally controlled phase shifter. In this example embodiment, the method also includes, following the determination of the calibrated capacitance for the first antenna element, designating a different one of the plurality of antenna elements as a first antenna element and repeatedly establishing the initial capacitance, varying the capacitance and determining the calibrated capacitance for the digitally controlled phase shifter associated with the antenna element now designated as the first antenna element.

In yet another example embodiment, an apparatus is provided for controlling the phase shift provided by a first digitally controlled phase shifter for an antenna. For the digitally controlled phase shifter including first and second digitally tunable capacitance circuitry coupled to opposite ends of a coupler, the apparatus includes control means for establishing an initial capacitance provided by a digitally tunable capacitance of the first and second digitally tunable capacitance circuitry. In response to control signals provided by at least one processor responsive to execution of computer program code stored by at least one memory, the apparatus includes control means for varying the capacitance provided by the digitally tunable capacitance of at least one of the first and second digitally tunable capacitance circuitry to have one or more candidate capacitances. The apparatus further includes determining means for determining a calibrated capacitance provided by the digitally tunable capacitance of the least one of the first and second digitally tunable capacitance circuitry based upon system performance in response to the digitally tunable capacitance having the one or more candidate capacitances.

In an example embodiment, the control means for establishing the initial capacitance in response to control signals provided by at least one processor includes control means for establishing the initial capacitance based upon a predefined parameter corresponding to the initial capacitance stored by the at least one memory. The control means for varying the capacitance in an example embodiment includes control means for varying the capacitance to have one or more candidate capacitances greater than the initial capacitance and one or more candidate capacitances less than the initial capacitance. In an example embodiment, the determining means for determining the calibrated capacitance includes determining means for determining the calibrated capacitance based upon the power provided by a radio to the antenna.

In an example embodiment, the antenna includes a plurality of antenna elements and a plurality of phase shifters associated with respective antenna elements including the first digitally controlled phase shifter associated with a first antenna element. The apparatus of this example embodiment also includes control means for establishing, prior to varying the capacitance and determining the calibrated capacitance and in response to control signals provided by the at least one processor responsive to execution of computer program code stored by at least one memory, a capacitance provided by a digitally tunable capacitance of first and second digitally tunable capacitance circuitry coupled to opposite ends of a coupler of a plurality of phase shifters other than the first digitally controlled phase shifter such that the plurality of phase shifters other than the first digitally controlled phase shifter eliminate contributions to the system performance from the antenna elements associated with the plurality of phase shifters other than the first digitally controlled phase shifter. In this example embodiment, the apparatus also includes determining means for designating, following the determination of the calibrated capacitance for the first antenna element, a different one of the plurality of antenna elements as a first antenna element and repeatedly establishing the initial capacitance, varying the capacitance and determining the calibrated capacitance for the digitally controlled phase shifter associated with the antenna element now designated as the first antenna element.

BRIEF DESCRIPTION OF THE DRAWINGS

Figure 1:
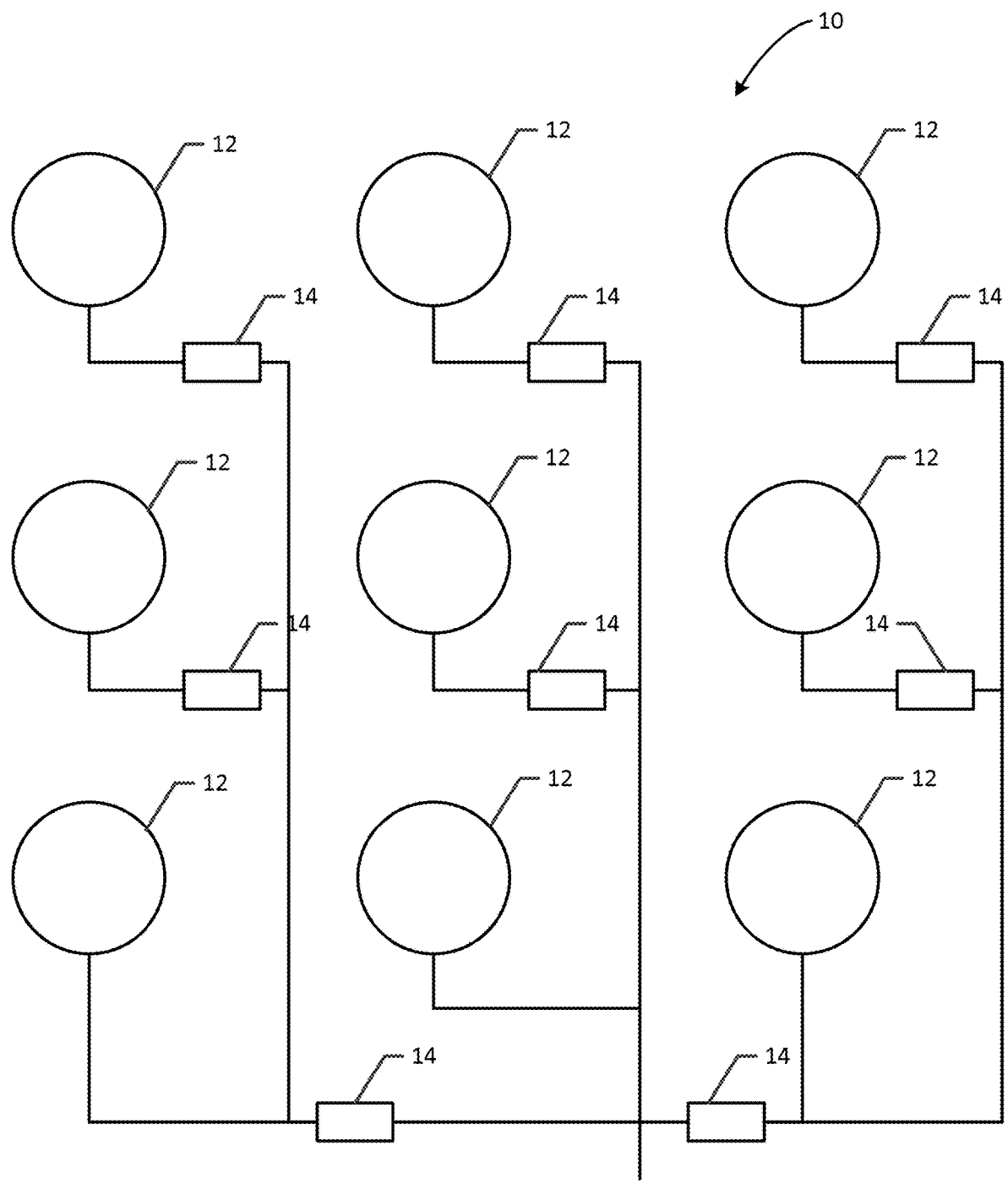
Figure 2:
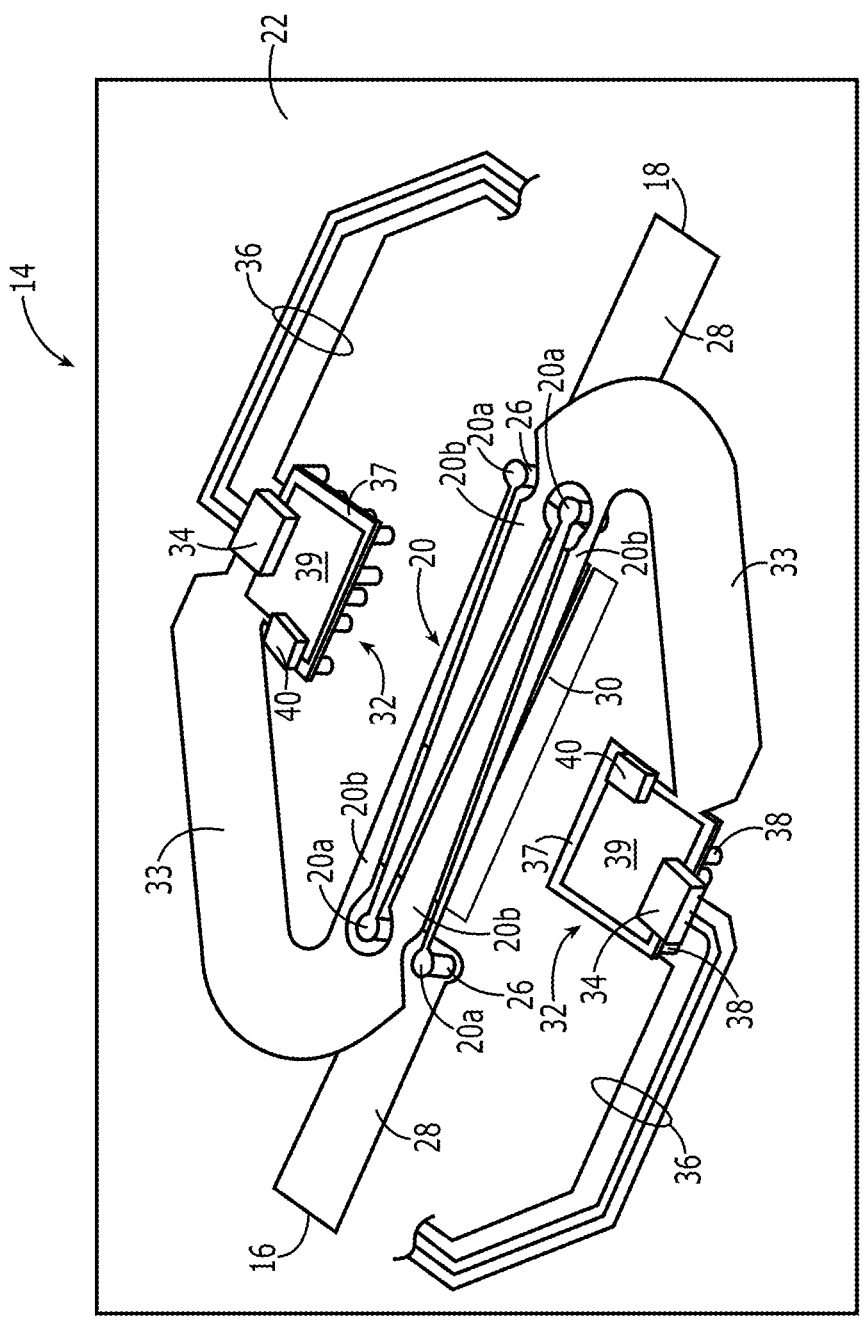
Figure 3:
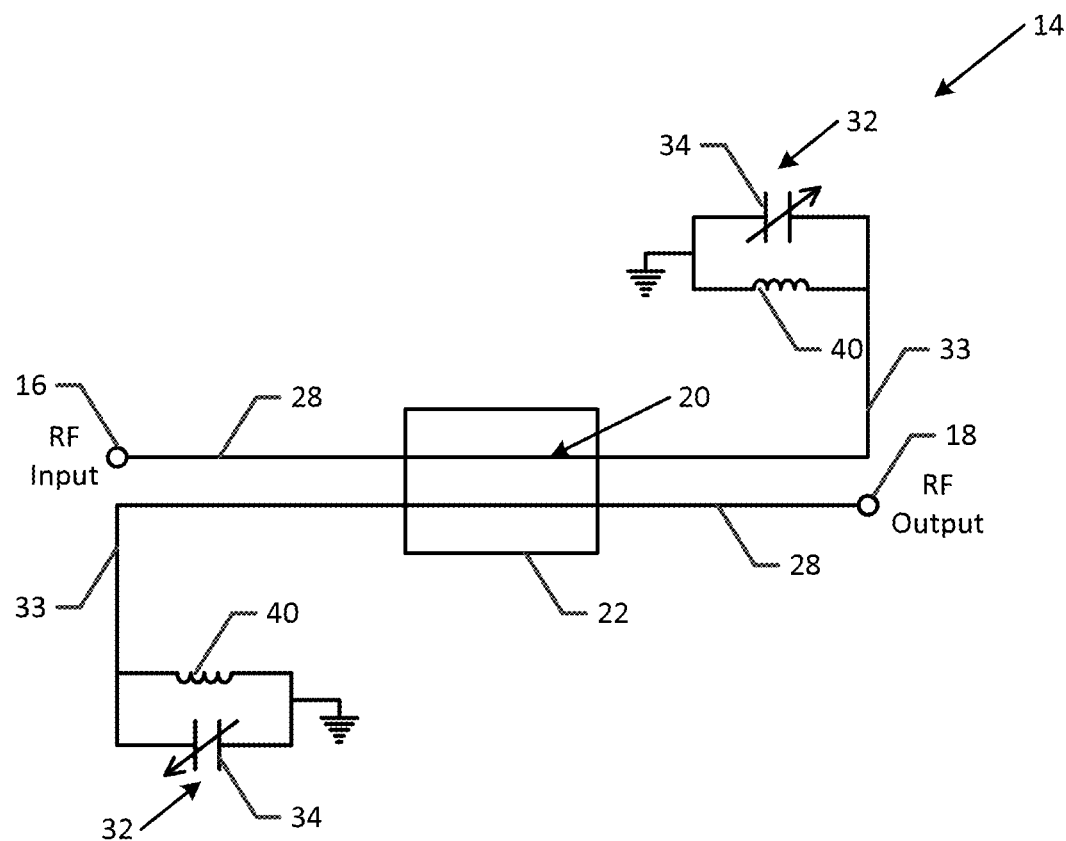
Figure 4:
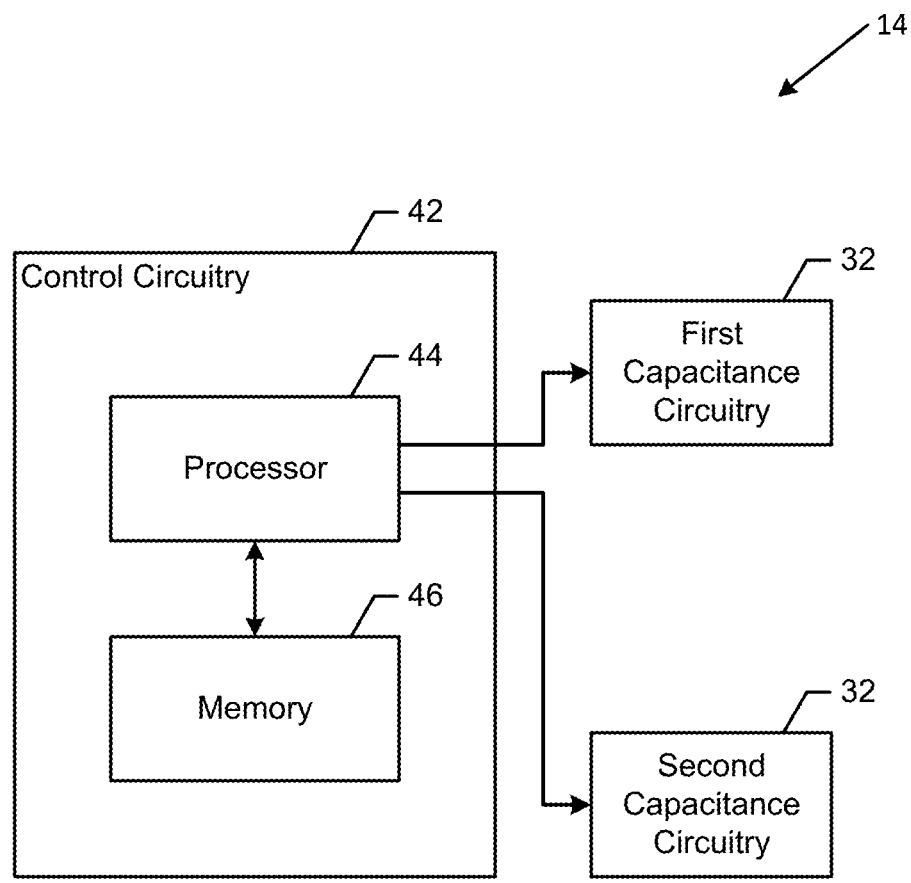
Figure 5:
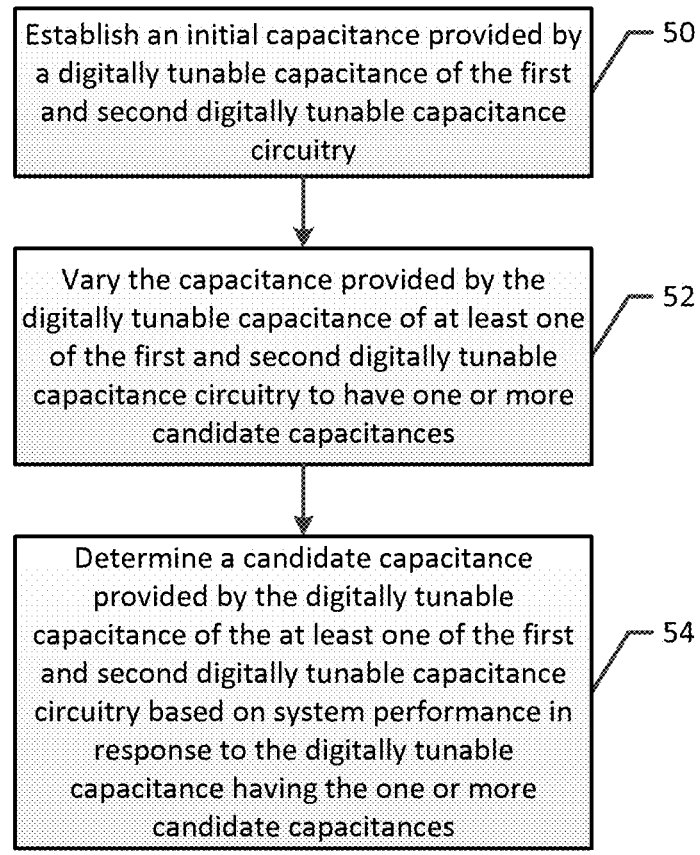
Figure 6:
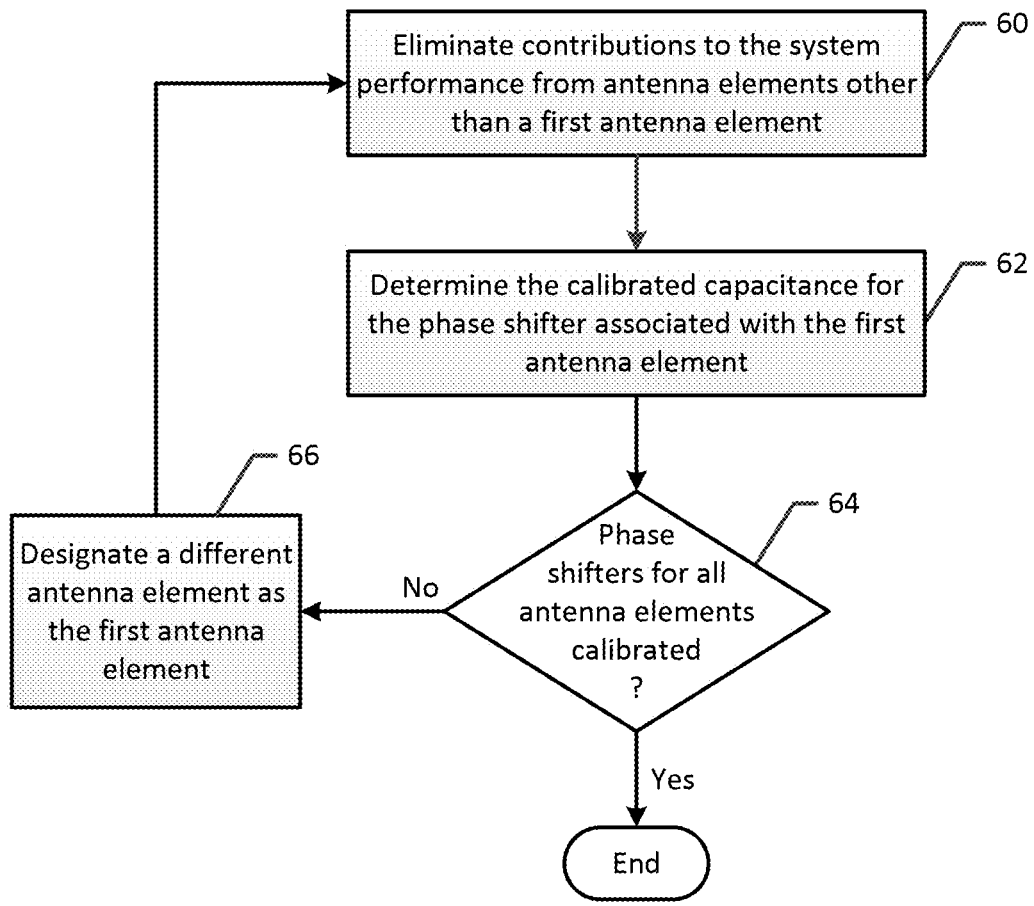
Figure 7A:
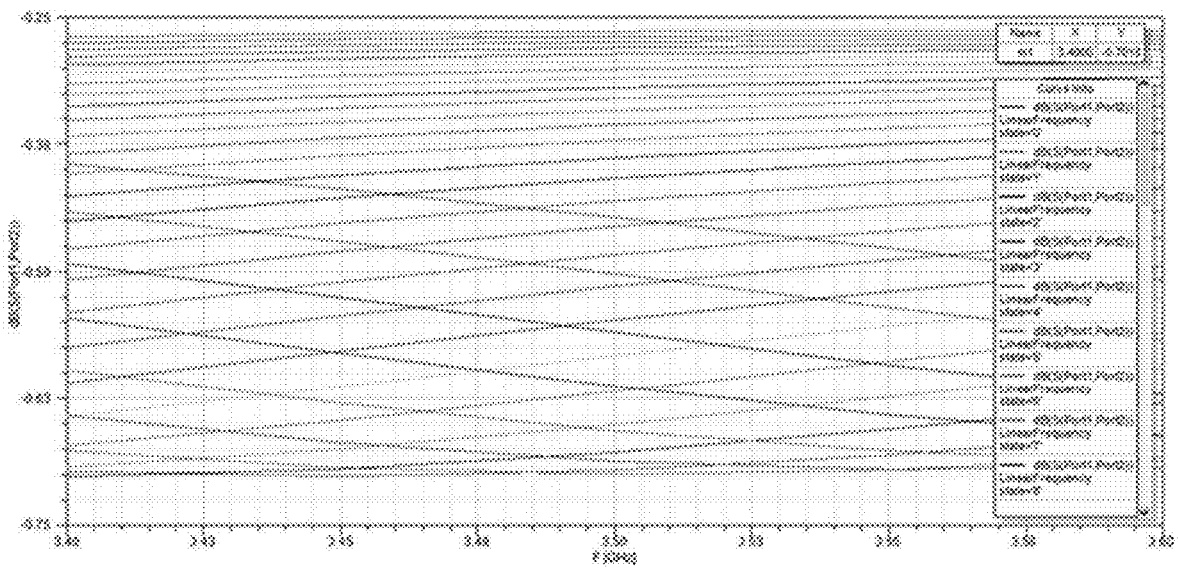
Figure 7B:
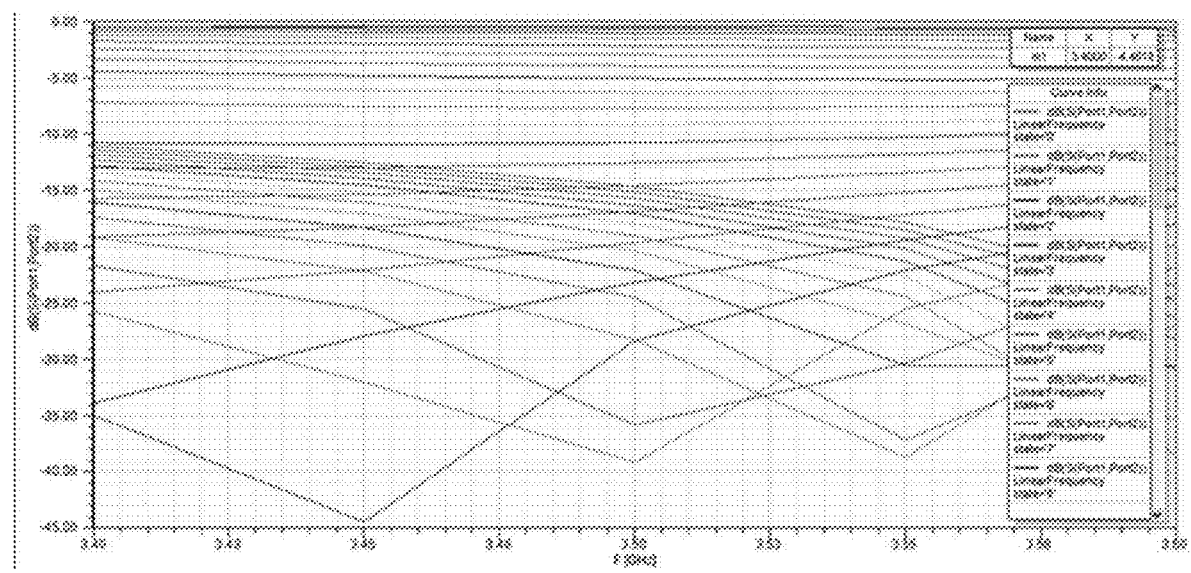

Having thus described certain example embodiments of the present disclosure in general terms, reference will hereinafter be made to the accompanying drawings, which are not necessarily drawn to scale, and wherein:

FIG. 1 is a plan view of an antenna including a plurality of antenna elements and a plurality of phase shifters associated with respective antenna elements and calibrated in accordance with an example embodiment of the present disclosure;

FIG. 2 is a perspective view of a digitally controlled phase shifter configured to modify the phase shift in accordance with an example embodiment of the present disclosure;

FIG. 3 is a schematic representation of a digitally controlled phase shifter that may be configured to modify the phase shift in accordance with an example embodiment of the present disclosure;

FIG. 4 is a block diagram of a digitally controlled phase shifter in accordance with an example embodiment of the present disclosure;

FIG. 5 is a flowchart depicting operations performed, such as by a digitally controlled phase shifter, in accordance with an example embodiment of the present disclosure;

FIG. 6 is another flowchart depicting operations performed, such as by a digitally controlled phase shifter, in accordance with an example embodiment of the present disclosure;

FIG. 7A is graph representing performance of a digitally controlled phase shifter in which the first and second digitally tunable capacitance circuitry are concurrently driven with the same control signal; and FIG. 7B is a graph representing performance of a digitally controlled phase shifter in which one of the first and second digitally tunable capacitance circuitry is subjected to a modified control signal, while the control signal provided to the other one of the first and second digitally tunable capacitance circuitry is maintained at a constant value.

DETAILED DESCRIPTION

Some embodiments of the present invention will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, field programmable gate array, and/or other computing device.

As defined herein, a "computer-readable storage medium," which refers to a physical storage medium (e.g., volatile or non-volatile memory device), may be differentiated from a "computer-readable transmission medium," which refers to an electromagnetic signal.

Referring now to FIG. 1, an antenna 10 is depicted that includes a plurality of antenna elements 12. The antenna may be deployed in a number of different applications. For example, the antenna may be utilized in telecommunications applications, such as to support radio frequency (RF) communications between base stations and other network equipment and user equipment. In the illustrated embodiment, the antenna includes nine antenna elements arranged in a 3-by-3 array. However, the antenna may include any number of antenna elements, such as two or more antenna elements, arranged in any pattern.

The antenna 10 also includes a phase shifter 14 associated with each antenna element 12 such that the main lobe of the beam transmitted and/or received by the antenna can be controllably steered. In an embodiment, such as illustrated in FIG. 1, in which the antenna includes a plurality of antenna elements, the antenna also includes a plurality of phase shifters, each associated with one or more antenna elements. While one embodiment is depicted in FIG. 1, the antenna elements and phase shifters may be differently configured in other embodiments, such as in instances in which the phase shifters are associated with some groups of antenna elements, but not other groups of antenna elements. In one embodiment, however, each antenna element may be individually steered in order to effect the beam steering of the antenna. In other embodiments, a phase shifter may be associated with a group of antenna elements such that the same phase shift is applied to the group of antenna elements. In some embodiments, the antenna supports multiple polarizations. For example, the antenna may be a dual polarized antenna configured, for example, to support a horizontal polarization and a vertical polarization. In such embodiments, the antenna includes even more phase shifters with a plurality of phase shifters being associated with each antenna element. In this regard, the phase shifters associated with a respective antenna element include one phase shifter associated with each different polarization of the antenna. For a dual polarized antenna, the antenna of an example embodiment therefore includes two phase shifters associated with each antenna element or each group of two or more antenna elements.

A digitally controlled phase shifter 14 associated with a respective antenna element 12 is depicted in FIG. 2. While FIG. 2 depicts one example embodiment of a digitally controlled phase shifter, the digitally controlled phase shifter may be differently configured in other embodiments. In the illustrated embodiment, the digitally controlled phase shifter includes an input port 16 and an output port 18 via which, for example, RF signals are received from the respective antenna element and transmitted to the respective antenna element. The input and output ports are coupled to opposite ends of a coupler 20. Although the coupler may be configured in various manners, the coupler of the illustrated embodiment is a double finger coupler extending between the input and output ports. In this regard, the coupler may include two sets of two fingers that extend from opposite directions and are arranged in an interlaced configuration. The distal ends 20a of one set of fingers of a double finger coupler are connected to the input port, while the distal ends of the other set of fingers are connected to the output port.

Although the digitally controlled phase shifter 14 may be constructed in various manners, the digitally controlled phase shifter of FIG. 2 has a multi-layer construction and, as such, may be embodied by a circuit board that includes at least two layers that are aligned with one another in a stacked relationship. In this regard, the input and output ports 16, 18 may be provided by a first layer 22, while the coupler 20 is provided by a second layer. In order to permit those portions of the digitally controlled phase shifter that reside on the first layer to be depicted, the second layer is not shown, other than the components, e.g., the coupler, of the digitally controlled phase shifter that are carried by the second layer. As a result of the multi-layer construction, the opposite ends of the coupler may be coupled to the input and output ports via conductive posts 26 or vias extending between the first and second layers.

In order to mitigate against impedance variation, the input and output ports 16, 18 may be connected to the opposite ends of the coupler 20 but by a quarter wave ($\lambda/4$) transmission line 28, such as a conductive trace having an electrical length that is an integer multiple of a quarter wavelength defined upon the first layer 22. In order to increase the tuning range of the phase shifter 14, the phase shifter of an example embodiment also includes a slot 30 defined by the first layer and positioned in alignment with the coupler, such as by underlying the coupler. In this regard, the slot generally underlies the majority of the coupler including the majority of the interlaced fingers of the coupler. The slot serves to enhance the tuning range of the phase shifter, facilitate matching of the impedance and reduce the insertion loss. In at least some embodiments, the first layer defines a ground plane such that the slot, that is, a nonconductive slot, is defined as an opening within the ground plane.

The digitally controlled phase shifter 14 also includes first and second digitally tunable capacitance circuitry 32, each of the first and second digitally tunable capacitance circuitry 32 being coupled to opposite ends of the coupler 20. For a double finger coupler, the digitally tunable capacitance circuitry is connected to the end 20*b* of the fingers that are opposite the distal ends 20*a* of the fingers connected to one of the input or output ports 16, 18. In an example embodiment, the first and second digitally tunable capacitance circuitry may be coupled to opposite ends of the coupler by a conductor 33 having an electrical length of a quarter wavelength, such as a conductive trace defined by the second layer that has an electrical length that is an integer multiple of a quarter wavelength. As with the coupler, the first and second digitally tunable capacitance circuitry are carried by and defined by the second layer, although the digital tunable capacitance circuitry may be carried by the first layer in other embodiments.

In an example embodiment depicted in FIGS. 2 and 3, the first and second digitally tunable capacitance circuitry 32 each include a digitally tunable capacitance 34, such as an integrated circuit (IC) digitally tunable capacitor that bridges across a gap defined by the second layer, having a capacitance that is controllably varied based upon a control signal in order to control the phase shift provided by the digitally controlled phase shifter 14. Thus, the capacitance provided by a digitally tunable capacitance may be set based upon the control signal provided thereto. While various types of digitally tunable capacitance may be utilized including a varactor diode, one example of a digitally tunable capacitance that is provided by way of example, but not of limitation, is a digitally tunable capacitor such as the 32CK417R SmarTune™ antenna tuner provided by Cavendish Kinetics, Ltd. or the PE 64906 DuNE™ digitally tunable capacitor provided by Peregrine Semiconductor Corp. The SmarTune™ antenna tuner and the PE64906 DuNE™ digitally tunable capacitor are both examples of IC digitally tunable capacitors.

In an example embodiment using a varactor diode as the digitally tunable capacitance, further digitally controllable circuitry is required to tune its capacitance value. The further digitally controllable circuitry is configured to be digitally controlled by software so that the digitally controllable circuitry provides a bias voltage to the varactor diode to tune its capacitance. The bias voltage provided to the varactor diode may be adjusted to select a different value of capacitance by the digitally controllable circuitry.

In an example embodiment where an IC is used as the digitally tunable capacitance, in addition to a control signal, the digitally tunable capacitance circuitry of an example embodiment also receives a power signal, a select (e.g., address) signal and a clock signal. As shown in FIG. 2, the first layer 22 may define conductive traces 36 for each of the control signal, the power signal and the clock signal. Conductive posts or vias 38 may extend from respective ones of the conductive traces to the digitally tunable capacitance circuitry carried by the second layer in order to deliver the control signal, the power signal, the select signal and the clock signal thereto. Alternatively, the conductive traces may be defined by the second layer. As shown in FIG. 3, the first and second digitally tunable capacitance circuitry of an example embodiment also include an inductor 40 that bridges across another gap defined by the second layer and is disposed in parallel with the respective digitally tunable capacitance in order to enhance the range of the phase shifter. In this regard, it is noted that FIG. 2 depicts the inductor as a lumped component. Similarly, the digitally tunable capacitance may be provided, not as an IC, but as a lumped component in other embodiments. Regardless of the configuration, the digitally tunable capacitance and the inductor are connected in accordance with the illustrated embodiment in parallel so as to extend between the conductor 33 at one end and a common portion 37 of the digitally tunable capacitance circuitry 32 that is connected to ground by a conductive trace that carries a ground signal. The conductive trace that carries the ground signal may be provided by the first layer as illustrated. In an embodiment in which an IC serves as the digitally tunable capacitance, the conductive trace may be directly connected to ground pin(s) of the IC. Alternatively, the conductive trace may be connected to the common portion of the digitally tunable capacitance circuitry by a conductive post or via. In other embodiments, the conductive trace may be provided by the second layer or by both the first and second layers. In an embodiment in which an IC serves as the digitally tunable capacitance and in which the second layer provides the grounding, a majority of the second layer may be a sheet of conductive ground plane and the ground pin(s) of the IC may be directly connected thereto. Further details regarding the electrical connections between digitally tunable capacitance and the inductor and/or other components of the digitally tunable capacitance circuitry are depicted by FIG. 3. While the digitally tunable capacitance circuitry of the illustrated embodiment includes only a single opening or hole 39, the number, shape and position of the openings may be varied depending upon, for example, the operating frequency of the phase shifter. Based upon control signals provided to the digitally tunable capacitance, the phase shift provided by the digitally controlled phase shifter may be controllably varied.

In order to control the phase shift, the digitally controlled phase shifter 14 of an example embodiment also includes control circuitry 42. As shown in FIG. 4, the control circuitry of an example embodiment includes at least one processor 44 and at least one memory 46 including computer program code stored thereby. The at least one memory and the computer program code are configured to, upon execution by the at least one processor, cause the control circuitry to vary the capacitance provided by the digitally tunable capacitance 34 of at least one of the first and second digitally tunable capacitance circuitry 32 in order to modify the phase shift provided by the digitally controlled phase shifter as a result of the corresponding change in the electrical length. The phase shift may be modified for various purposes including, for example, to calibrate the phase shifter to accommodate variations in the manufacturing process such that the phase shifter performs as intended, notwithstanding deviations from the manufacturing specifications.

The processor 44 (and/or co-processors or any other circuitry assisting or otherwise associated with the processor) may be in communication with the memory 46 via a bus for passing information among components of the control circuitry 42 and, in turn, the phase shifter 14. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processor). The memory device may be configured to store information, data, content, applications, instructions, or the like for enabling the control circuitry to carry out various functions in accordance with an example embodiment of the present invention. For example, the memory device could be configured to buffer input data for processing by the processor. Additionally or alternatively, the memory device could be configured to store instructions for execution by the processor.

The processor 44 may be embodied in a number of different ways. For example, the processor may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multi-threading.

In an example embodiment, the processor 44 may be configured to execute instructions stored in the memory device 46 or otherwise accessible to the processor. Alternatively or additionally, the processor may be configured to execute hard coded functionality. As such, whether configured by hardware or software methods, or by a combination thereof, the processor may represent an entity (e.g., physically embodied in circuitry) capable of performing operations according to an embodiment of the present disclosure while configured accordingly. Thus, for example, when the processor is embodied as an ASIC, FPGA or the like, the processor may be specifically configured hardware for conducting the operations described herein. Alternatively, as another example, when the processor is embodied as an executor of instructions, the instructions may specifically configure the processor to perform the algorithms and/or operations described herein when the instructions are executed. However, in some cases, the processor may be a processor of a specific device (e.g., an image processing system) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In order to control the phase shift provided by a digitally controlled phase shifter 14, the control circuitry 42, such as the at least one processor 44 and the at least one memory 46, are configured to perform the operations set forth by FIG. 5. In this regard, an initial capacitance provided by the digitally tunable capacitance 34 of the first and second digitally tunable capacitance circuitry 32 is established in association with a desired beam direction. See block 50 of FIG. 5. For example, the control circuitry includes control means, such as the at least one memory and the computer program code configured, upon execution by the at least one processor, for causing a control signal to be provided to the digitally tunable capacitance of at least one of the first and second digitally tunable capacitance circuitry and, in an example embodiment, each of the first and second digitally tunable capacitance circuitry, to establish the initial capacitance provided by the digitally tunable capacitance. In an example embodiment, the at least one memory stores a predefined parameter that corresponds to the initial capacitance provided by the digitally tunable capacitance of a respective digitally tunable capacitance circuitry. For example, the predefined parameter may define the value of the control signal provided to the respective digitally tunable capacitance circuitry in order to establish the initial capacitance to be provided by the digitally tunable capacitance. The initial capacitances provided by the digitally tunable capacitance of each of the first and second digitally tunable capacitance circuitry may be identical, or may be different in other embodiments.

As shown in block 52, the capacitance provided by the digitally tunable capacitance 34 of at least one of the first and second digitally tunable capacitance circuitry 32 is then varied to have one or more candidate capacitances. In this regard, the control circuitry 42 includes control means, such as the at least one memory 46 and the computer program code configured, upon execution by the at least one processor 44, for causing a control signal to be provided to the digitally tunable capacitance of the at least one of the first and second digitally tunable capacitance circuitry in order to cause the capacitance provided by the digitally tunable capacitance to vary so as to have one or more candidate capacitances. As such, the at least one memory may store predefined parameters associated with the different candidate capacitances such that the generation by the control circuitry 42 of a control signal corresponding to one predefined parameter stored by the at least one memory and corresponding to a respective candidate capacitance causes the digitally tunable capacitance to have the associated candidate capacitance. While the control circuitry may be configured to vary the capacitance provided by the digitally tunable capacitance to have one or more candidate capacitances in various manners, the control circuitry of an example embodiment is configured to cause the capacitance provided by the digitally tunable capacitance to be varied so as to have one or more candidate capacitances greater than the initial capacitance and one or more candidate capacitances less than the initial capacitance. In this regard, the one or more candidate capacitances greater than the initial capacitance and the one or more candidate capacitances less than the initial capacitance may have equal step sizes or different step sizes in various embodiments. While the digitally tunable capacitance of one of the first and second digitally tunable capacitance circuitry is directed to have one or more candidate capacitances, the digitally tunable capacitance of the other one of the first and second digitally tunable capacitance circuitry may continue to be driven to have the same, initial capacitance.

As shown in block 54 of FIG. 5, a calibrated capacitance provided by the digitally tunable capacitance 34 of the respective digitally tunable capacitance circuitry 32 is determined based upon the system performance in response to the digitally tunable capacitance having the one or more candidate capacitances. In this regard, the control circuitry 42 includes processing means, such as the at least one memory 46 and the computer program code are configured, upon execution by the at least one processor 44, for evaluating the system performance and identify a respective one of the candidate capacitances as the calibrated capacitance based upon the system performance. While the system performance may be defined in various manners, the system performance of one embodiment is based upon the power provided by a radio to the antenna 10. As such, while the digitally tunable capacitance has each of the candidate capacitances, the antenna is operated with RF signals being received and/or transmitted such that RF signals flow between the input and output ports 16, 18 of the phase shifter 14. During operation of the antenna, the power provided by a radio to the phase shifter and then, to the antenna is measured upon its receipt by or transmission by the antenna. While the power may be defined in various manners, the power of one embodiment defined as the received signal received power (RSRP). As such, the control circuitry, such as the at least one memory and the computer program code, is configured to, upon execution by the at least one processor, determine the candidate capacitance of the digitally tunable capacitance at which the power provided by the radio to the antenna is greatest and may define the calibrated capacitance to be equal to the candidate capacitance associated with the greatest power.

As such, the digitally controlled phase shifter 14 may thereafter be operated with one of the first and second digitally tunable capacitance circuitry 32 being controlled such that the respective digitally tunable capacitance 34 provides the predefined initial capacitance, while the digitally tunable capacitance of the other of the first and second digitally tunable capacitance circuitry provides the calibrated capacitance. As such, the power provided by the radio to the antenna 10 that includes the digitally controlled phase shifter is maximized.

This calibration process may be performed upon manufacture of the antenna 10 in order to account for variations relative to the manufacturing specifications and/or may be performed upon installation. If desired, this process may be repeated to account for variations that occur over the lifetime of the antenna and/or upon modification of the antennae, such as reinstallation or the like.

The calibration process described above in relation to FIG. 5 may be repeated for each phase shifter 14 of the antenna 10. In this regard and as shown in FIG. 1, an antenna may include a plurality of antennae elements 12 and a plurality of phase shifters associated with respective antenna elements. Prior to calibrating a first digitally controlled phase shifter associated with a first antenna element, the capacitance provided by the digitally tunable capacitance 34 of the first and second digitally tunable capacitance circuitry 32 of the plurality of phase shifters other than the first digitally controlled phase shifter may be established such that contributions from the antenna elements associated with the plurality of phase shifters other than the first digitally controlled phase shifter are eliminated from the system performance, thereby isolating the performance of the first digitally controlled phase shifter. See block 60 of FIG. 6. In this regard, the control circuitry 42 includes control means, such as at least one memory 46 and the computer program code are configured, upon execution by the at least one processor 44, for causing control signals to be provided to the digitally tunable capacitance of the first and second digitally tunable capacitance circuitry of the plurality of phase shifters other than the first digitally controlled phase shifter in order to effectively eliminate or prevent the antenna elements associated with the plurality of phase shifters other than the first digitally controlled phase shifter from contributing to the system performance.

As described above and as shown with reference to FIG. 7A for Long Term Evolution (LTE) Band 42, the performance of a phase shifter 14 having the same control signals applied to the digitally tunable capacitance 34 of the first and second digitally tunable capacitance circuitry 32 results in a relatively small loss over the frequency range in each of 31 different states (each represented by a different line) of the digitally tunable capacitance. In contrast, in an instance in which different control signals are provided to the digitally tunable capacitance of the first and second digitally tunable capacitance circuitry, such as by varying one control signal (and correspondingly varying the capacitance provided by the respective digitally tunable capacitance) while maintaining the other control signal (and correspondingly the capacitance provided by the respective digitally tunable capacitance) at a constant value, the phase shifter may introduce significant loss including loss up to 45 dB in certain circumstances as shown in FIG. 7B for LTE Band 42, thereby effectively preventing propagation of the RF signals and preventing the corresponding antenna element 12 from contributing to the system performance. For example, by providing control signals such that the digitally tunable capacitance of one of the first and second digitally tunable capacitance circuitry has a maximum capacitance and the digitally tunable capacitance of the other one of the first and second digitally tunable capacitance circuitry has a minimum capacitance, the loss with respect to the RF signals received by the phase shifter is substantial, thereby eliminating the antenna element 12 corresponding to the phase shifter from contributing to the system performance.

By eliminating all of the phase shifters 14 other than a first digitally controlled phase shifter from impacting the system performance, the first digitally controlled phase shifter may then be calibrated as described above in conjunction with FIG. 5. See block 62 of FIG. 6. Thereafter, this process may be repeated for the digitally controlled phase shifter associated with each antenna element. As shown by blocks 64 and 66 of FIG. 6, the control circuitry 42 includes determining means, such as the at least one processor 44, for determining if all phase shifters have been calibrated and, if not, designating a different antenna element as the first antenna element such that the phase shifter associated therewith is subsequently calibrated. In an instance in which the antenna 10 has multiple polarizations, such as dual polarization, this process may also be repeated for each phase shifter for each polarization supported by each antenna element of the antenna.

As such, the antenna 10 performance may be calibrated in order to accommodate for manufacturing variations or the like. By calibrating the phase shifters 14 of the antenna in an automated fashion, such as based upon the execution of a computer program code stored by the at least one memory 46 and executed by at least one processor 44, the calibration may be performed in both an efficient and an accurate manner, thereby facilitating system performance while increasing the efficiency with which the antenna may be manufactured, installed or the like.

As described above, FIGS. 5 and 6 illustrate flowcharts of control circuitry 42, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory device 46 of an apparatus employing an embodiment of the present invention and executed by a processor 44 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described above, such as in conjunction with the flowcharts of FIGS. 5 and 6. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described above.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed is:

1. A first digitally controlled phase shifter associated with a first antenna element of an antenna that comprises a plurality of antenna elements and a plurality of phase shifters associated with respective antenna elements, wherein the first digitally controlled phase shifter comprises:
   a coupler extending between input and output ports;
   first and second digitally tunable capacitance circuitry coupled to opposite ends of the coupler, each first and second digitally tunable capacitance circuitry comprising a digitally tunable capacitance; and
   control circuitry comprising at least one processor and at least one memory including computer program code, the at least one memory and the computer program code configured to, upon execution by the at least one processor, cause the control circuitry to:
   cause control signals to be provided to digitally tunable capacitance of first and second digitally tunable capacitance circuitry coupled to opposite ends of a coupler of the plurality of phase shifters other than the first digitally controlled phase shifter in order to establish a capacitance provided by the digitally tunable capacitance such that the plurality of phase shifters other than the first digitally controlled phase shifter eliminate contributions from the antenna elements associated with the plurality of phase shifters other than the first digitally controlled phase shifter upon system performance; and
   vary a capacitance provided by the digitally tunable capacitance of at least one of the first and second digitally tunable capacitance circuitry in order to modify a phase shift provided by the first digitally controlled phase shifter.

2. A first digitally controlled phase shifter according to claim 1 wherein the coupler comprises a double finger coupler extending between the input and output ports of the first digitally controlled phase shifter.

3. A first digitally controlled phase shifter according to claim 1 further comprising a slot defined in a ground plane and positioned in alignment with the coupler.

4. A first digitally controlled phase shifter according to claim 1 wherein, prior to varying the capacitance, the at least one memory and the computer program code are further configured to, upon execution by the at least one processor, cause a control signal to be provided to the digitally tunable capacitance of the at least one of the first and second digitally tunable capacitance circuitry to establish an initial capacitance provided by the digitally tunable capacitance, and wherein, following varying of the capacitance, the at least one memory and the computer program code are further configured to, upon execution by the at least one processor, determine a calibrated capacitance provided by the digitally tunable capacitance of the at least one of the first and second digitally tunable capacitance circuitry based upon system performance in response to the digitally tunable capacitance having the one or more candidate capacitances.

5. A first digitally controlled phase shifter according to claim 4 wherein the at least one memory and the computer program code are configured to, upon execution by the at least one processor, cause the control signal to be provided to establish the initial capacitance based upon a predefined parameter corresponding to the initial capacitance stored by the at least one memory.

6. A first digitally controlled phase shifter according to claim 4 wherein the at least one memory and the computer program code are configured to, upon execution by the at least one processor, cause the control signal to be provided to vary the capacitance so as to have one or more candidate capacitances greater than the initial capacitance and one or more candidate capacitances less than the initial capacitance.

7. A first digitally controlled phase shifter according to claim 4 wherein the at least one memory and the computer program code are configured to, upon execution by the at least one processor, determine the calibrated capacitance based upon a power provided by a radio to the antenna.

8. A control circuitry for controlling a phase shift provided by a first digitally controlled phase shifter associated with a first antenna element of an antenna that comprises a plurality of antenna elements and a plurality of phase shifters associated with respective antenna elements, wherein the first digitally controlled phase shifter comprises first and second digitally tunable capacitance circuitry coupled to opposite ends of a coupler, and wherein the control circuitry comprises:
 at least one processor; and
 at least one memory including computer program code, the at least one memory and the computer program code configured, upon execution by the at least one processor, to:
 cause control signals to be provided to digitally tunable capacitance of first and second digitally tunable capacitance circuitry coupled to opposite ends of a coupler of the plurality of phase shifters other than the first digitally controlled phase shifter in order to establish a capacitance provided by the digitally tunable capacitance such that the plurality of phase shifters other than the first digitally controlled phase shifter eliminate contributions from the antenna elements associated with the plurality of phase shifters other than the first digitally controlled phase shifter upon system performance; and
 cause a control signal to be provided to the digitally tunable capacitance of at least one of the first and second digitally tunable capacitance circuitry to vary a capacitance provided by the digitally tunable capacitance so as to have one or more candidate capacitances and to correspondingly modify the phase shift provided by the first digitally controlled phase shifter.

9. A control circuitry according to claim 8 wherein, prior to varying the capacitance, the at least one memory and the computer program code are further configured to, upon execution by the at least one processor, cause a control signal to be provided to the digitally tunable capacitance of the at least one of the first and second digitally tunable capacitance circuitry to establish an initial capacitance provided by the digitally tunable capacitance, and wherein, following varying of the capacitance, the at least one memory and the computer program code are further configured to, upon execution by the at least one processor, determine a calibrated capacitance of the digitally tunable capacitance of the at least one of the first and second digitally tunable capacitance circuitry based upon system performance in response to the digitally tunable capacitance having the one or more candidate capacitances.

10. A control circuitry according to claim 9 wherein the at least one memory and the computer program code are configured to, upon execution by the at least one processor, cause the control signal to be provided to establish the initial capacitance based upon a predefined parameter corresponding to the initial capacitance stored by the at least one memory.

11. A control circuitry according to claim 9 wherein the at least one memory and the computer program code are configured to, upon execution by the at least one processor, cause the control signal to be provided to vary the capacitance so as to have one or more candidate capacitances greater than the initial capacitance and one or more candidate capacitances less than the initial capacitance.

12. A control circuitry according to claim 9 wherein the at least one memory and the computer program code are configured to, upon execution by the at least one processor, determine the calibrated capacitance based upon a power provided by a radio to the antenna.

13. A method for controlling a phase shift provided by a first digitally controlled phase shifter associated with a first antenna element of an antenna that comprises a plurality of antenna elements and a plurality of phase shifters associated with respective antenna elements, the method comprising:
 establishing, in response to control signals provided by at least one processor responsive to execution of computer program code stored by at least one memory, a capacitance of digitally tunable capacitance of first and second digitally tunable capacitance circuitry coupled to opposite ends of a coupler of the plurality of phase shifters other than the first digitally controlled phase shifter such that the plurality of phase shifters other than the first digitally controlled phase shifter eliminate contributions from the antenna elements associated with the plurality of phase shifters other than the first digitally controlled phase shifter upon system performance;
 for the first digitally controlled phase shifter comprising first and second digitally tunable capacitance circuitry coupled to opposite ends of a coupler, establishing an initial capacitance provided by a digitally tunable capacitance of the first and second digitally tunable capacitance circuitry;
 in response to control signals provided by at least one processor responsive to execution of computer program code stored by at least one memory, varying the capacitance provided by the digitally tunable capacitance of at least one of the first and second digitally tunable capacitance circuitry to have one or more candidate capacitances; and
 determining a calibrated capacitance provided by the digitally tunable capacitance of the at least one of the first and second digitally tunable capacitance circuitry based upon system performance in response to the digitally tunable capacitance having the one or more candidate capacitances.

14. A method according to claim 13 wherein establishing the initial capacitance comprises establishing the initial capacitance in response to control signals provided by at least one processor based upon a predefined parameter corresponding to the initial capacitance stored by the at least one memory.

15. A method according to claim 13 wherein varying the capacitance comprises varying the capacitance to have one or more candidate capacitances greater than the initial capacitance and one or more candidate capacitances less than the initial capacitance.

16. A method according to claim 13 wherein determining the calibrated capacitance comprises determining the calibrated capacitance based upon a power provided by a radio to the antenna.

17. A method according to Claim 13 further comprising, following determining the calibrated capacitance for the first antenna element, designating a different one of the plurality of antenna elements as the first antenna element and repeatedly establishing the initial capacitance, varying the capacitance and determining the calibrated capacitance for the different one of the plurality of antenna elements now designated as the first antenna element.

18. A first digitally controlled phase shifter according to claim 1 wherein the at least one memory and the computer program code are configured to, upon execution by the at least one processor, cause the control circuitry to cause control signals to be provided to eliminate contributions from the antenna elements associated with the plurality of phase shifters other than the first digitally controlled phase shifter upon system performance by causing control signals to be provided to establish different capacitances by the digitally tunable capacitance of the first and second digitally tunable capacitance circuitry coupled to opposite ends of the coupler of a respective phase shifter other than the first digitally controlled phase shifter.

19. A control circuitry according to claim 8 wherein the at least one memory and the computer program code are configured to, upon execution by the at least one processor, cause control signals to be provided to eliminate contributions from the antenna elements associated with the plurality of phase shifters other than the first digitally controlled phase shifter upon system performance by causing control signals to be provided to establish different capacitances by the digitally tunable capacitance of the first and second digitally tunable capacitance circuitry coupled to opposite ends of the coupler of a respective phase shifter other than the first digitally controlled phase shifter.

20. A base station or user equipment comprising a first digitally controlled phase shifter according to claim 1.

* * * * *